United States Patent Office 3,093,844
Patented June 18, 1963

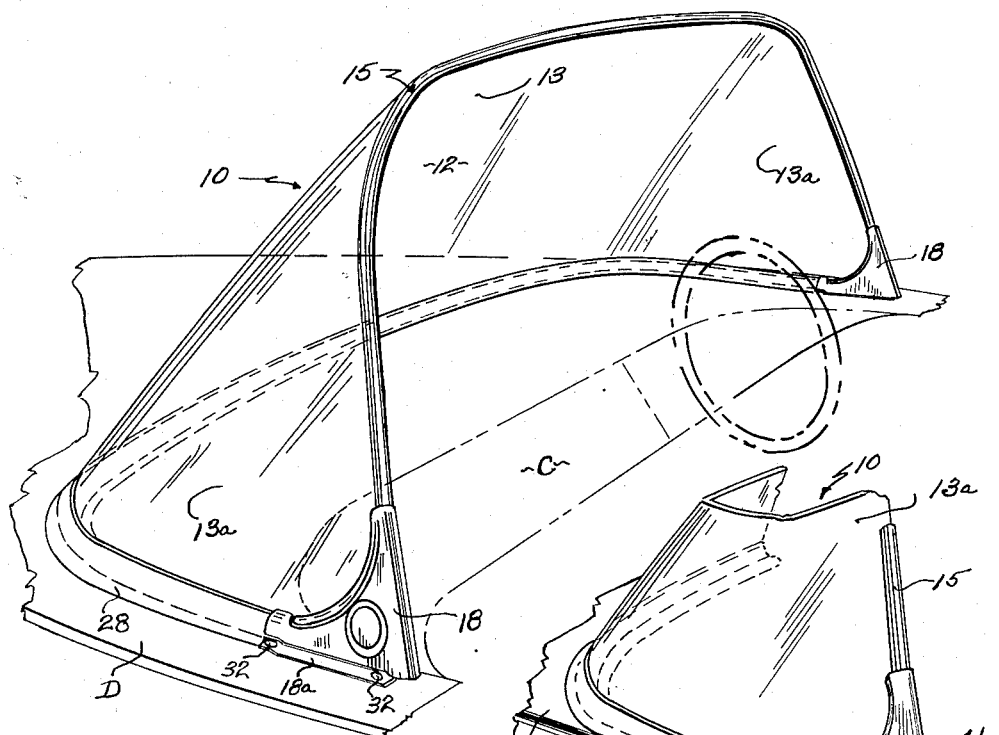
FIG. 1
FIG. 4
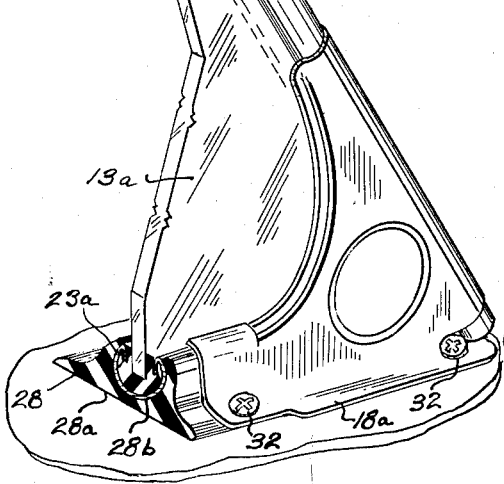
FIG. 2
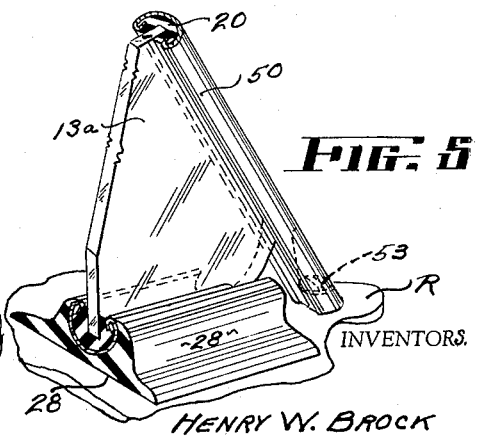
FIG. 5
INVENTORS.
HENRY W. BROCK
FRANK J. HATTAN
BY Meyer Baldwin, Doran & Young
ATTORNEYS

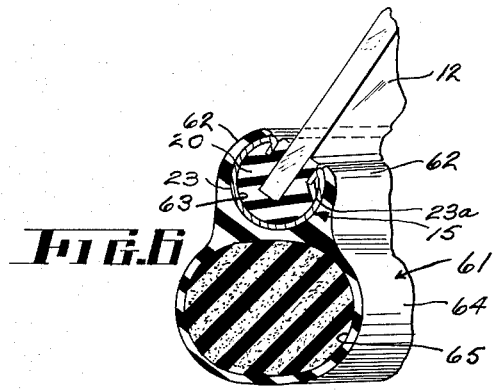
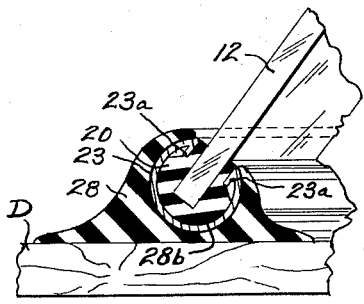
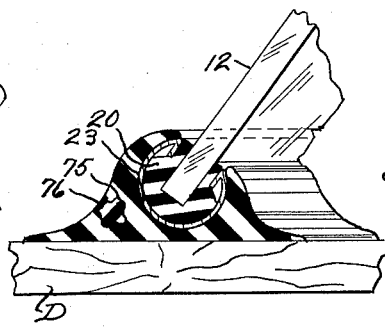
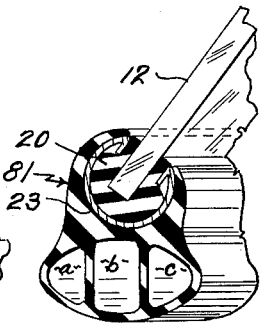
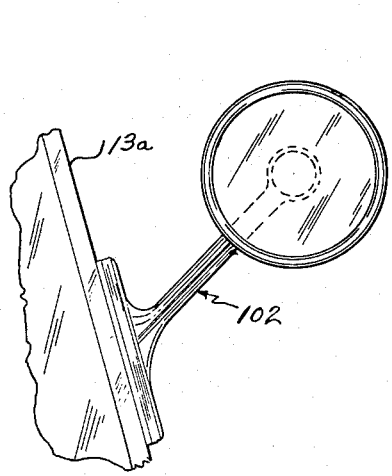
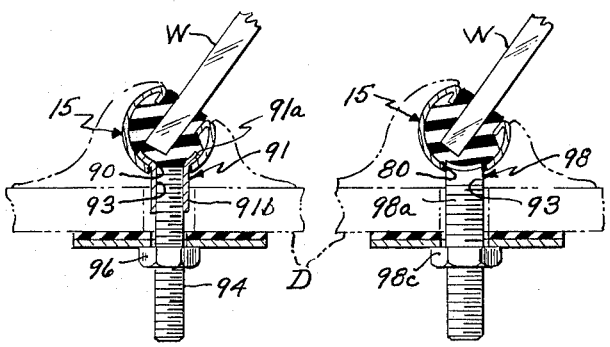

3,093,844
WINDSHIELD ASSEMBLY
Henry W. Brock, Willoughby, and Frank J. Hattan, Parma, Ohio, assignors to The Standard Products Company, Cleveland, Ohio, a corporation of Ohio
Filed Mar. 28, 1961, Ser. No. 98,817
1 Claim. (Cl. 9—1)

This invention relates to a novel and improved windshield assembly, and more particularly to a windshield assembly especially designed for use on a boat or like watercraft.

A primary object of the present invention is the provision of a novel and improved windshield assembly especially designed for use on a boat or like watercraft, and which is substantially unitary in its construction.

Another object of the present invention is the provision of a new and improved windshield assembly especially designed for use on a boat or like watercraft, and which assembly comprises a one-piece windshield formed preferably of glass or like transparent material, a windshield supporting frame extending around and attached to the peripheral windshield edge and means for mounting the complete assembly to the deck of said watercraft.

Another object of the present invention is the provision of a new and improved windshield assembly of the type described in the preceding paragraph, and wherein sealing means attached to the bottom peripheral edge portion of the windshield is in sealing relation with the latter and the boat deck to thereby provide a liquid-tight seal therebetween, said windshield assembly in addition, comprising a single structural unit, and which is intended to be permanently attached in an upright windshielding position on the aforesaid deck of said watercraft.

Additional objects and advantages of the windshield assembly of the present invention will be apparent to one skilled in the art to which it pertains, and upon reference to the following disclosure of several preferred embodiments thereof and which are illustrated in the accompanying drawings forming a part of this specification and wherein:

FIG. 1 is a fragmentary perspective view of a windshield assembly embodying the present invention and which is mounted in an upright windshielding position on a boat deck, extending laterally across the latter and forwardly of the cockpit of said watercraft;

FIG. 2 is a fragmentary perspective view showing a preferred form of corner bracket for mounting the windshield assembly to the boat deck;

FIG. 3 is a fragementary perspective view showing the configuration of seal strip carried on the bottom peripheral windshield edge;

FIG. 4 is a fragmentary perspective view of a modified form of corner bracket;

FIG. 5 is a fragmentary side perspective view of a third embodiment of corner assembly for mounting the windshield to the boat deck;

FIGS. 6, 7 and 8 are each fragmentary perspective views illustrating several modified forms of seal strip for attachment to the bottom peripheral windshield edge;

FIG. 9 is a fragmentary perspective view showing anchor means for fastening the bottom peripheral edge of the rigid windshield frame directly to the deck of the boat;

FIG. 10 is a second embodiment of anchor means for permanently attaching the aforesaid rigid windshield frame to the boat deck; and FIG. 11 is a fragmentary side elevational view of the windshield assembly of the present invention and showing a rear view mirror bonded directly to the windshield of said assembly.

Referring now to the drawings throughout which like elements are designated by the same reference character, the unitary windshield assembly of the present invention, as is herein designated in its entirety by the reference numeral 10, is especially designed for permanet attachment to the deck D of a boat or like watercraft, as may be best seen in FIG. 1, the instant assembly being disposed in an upright windshielding position and extending laterally across the deck and forwardly of the cockpit C of said watercraft.

Merely for purposes of the present disclosure, the instant configuration of windshield, as is identified in its entirety by the reference numeral 12, is a one-piece windshield commonly referred to as a "wrap around" windshield, and having a central portion 13 which may be slightly curved in its longitudinal extension, and side sections 13a integrally formed with said central section and extending longitudinally outwardly and rearwardly from opposite ends thereof.

As will be later apparent, other configurations of windshield may be utilized in the instant assembly of the present invention without departing from the inventive concepts of the same as are herein disclosed.

The windshield 12 is intended to have its peripheral edge encased within a rigid supporting frame, said frame being identified in its entirety by the reference numeral 15, and which, in addition, is intended to mount a corner bracket 18 at each of its opposed ends, the latter being rigidly fastened to the boat deck to thereby permanently fasten said assembly to the latter.

As is best seen in FIGS. 1 and 2, the windshield frame 15 comprises a seal strip 20 being somewhat C-shaped in its cross sectional configuration, and formed of a suitable material such as nitrile rubber as referred to in the art, said strip, in addition, being suitably bonded to said peripheral edge.

A rigid channel member 23 formed perferably of a suitable metallic material, is placed over and around said seal strip 20, said channel conforming in cross sectional configuration to the corresponding configuration of said strip, and preferably having an inwardly and reversibly projecting lip 23a formed on each of its opposed longitudinal edges, and which are adapted to engage said strip disposed therein and thereby firmly anchor said channel to the latter. If desired, said channel may also be adhesively or otherwise fastened to said seal strip to thereby provide a more rigid assembly.

The windshield assembly, as is aforementioned, is intended to be firmly attached to the deck of the boat or like watercraft so as to extend laterally thereacross and in front of the boat cockpit C in an upright windshielding position.

To accomplish this, a seal member 28 formed preferably of a suitable pliable material such as rubber, is formed with a groove 28b which extends longitudinally centrally therethrough, and which is of such configuration as to receive the portion of the frame 15 overlying the bottom peripheral edge of the windshield 12, said seal being of sufficient resiliency as to firmly attach itself to said frame. If desired, the seal member 28 may also be adhesively or otherwise attached to the windshield frame 15.

The seal member 28, as best seen in FIG. 2, is formed with a wide, flat base 28a which is adapted to lie over and in direct contact with the boat deck D to thereby provide a liquid-tight seal between the latter and the windshield assembly. As will be apparent, the contour of the bottom peripheral edge of the windshield is selected so as to closely conform to the lateral contour of the boat deck D to thereby facilitate an effective seal between the latter and assembly.

As seen in FIG. 1, the windshield assembly is intended to be substantially centered on the boat deck, extending laterally thereacross, the side sections 13a thereof projecting outwardly and rearwardly therefrom so as to locate the corner brackets 18 mounted on the opposed ends of said assembly centrally on the top surface of the adjoining side rails of said watercraft.

With the windshield assembly 10 thus disposed, it is then securely attached to the boat deck D, and for this purpose, each of said brackets 18 is seen to extend partially over so as to embrace the portions of the windshield frame 15 and the seal member 28 closely adjoining one end of the windshield, said bracket, in addition, being provided with a flange 18a extending outwardly therefrom and adapted to overlie the adjacent side rail. Suitable fasteners as indicated at 32 rigidly fasten the flange 18a to said side rail being thereby effective to securely attach the windshield assembly to the deck of the watercraft. If desired, the rearward end of each bracket 18 may be provided with a suitable recess 34 which is intended to accommodate an additional fastener 35, the latter being completely disposed within said recess and likewise engaging with the side rail to thereby anchor said bracket end to the latter.

In FIG. 4, I herein disclose a modified corner windshield bracket 41 that is especially designed for attaching the windshield assembly 10 to a boat or like watercraft which has a somewhat more narrow side rail, the latter being identified herein by the reference character R.

Specifically, as seen in FIG. 4, the windshield assembly 10 is located centrally on the boat deck D in its normal windshielding position wherein the seal member 28 is in substantial sealing relation with said deck, and the side windshield sections 13a of said assembly extend rearwardly along the side rails R closely adjacent the outer edge thereof.

Each corner bracket 41 is formed with a mounting flange 41a which extends downwardly along the outside vertical face of its associated side rail and suitable fasteners 43 firmly anchor said flange, and hence the windshield assembly 10 attached thereto, to the boat deck D and adjoining side rails R. As in the previous embodiment of corner bracket, the instant form may also have an additional fastener 45 disposed in a recess 46 located on the end of said bracket being thus effective to anchor said bracket part to said side rail.

In FIG. 5, a modified windshield assembly is herein shown and which is of somewhat more single construction than the previous embodiments in that the corner brackets are removed and the portion of the windshield frame 50 mounted on the upper peripheral windshield edge has its opposed ends extending downwardly and into engagement with the surface of the side rails R, said frame ends being fastened at 53 to the latter to thereby secure the assembly to said boat. If desired, the seal member 28 may also be adhesively or otherwise attached to the boat deck D to thereby firmly anchor the windshield assembly 10 to the same.

In FIG. 6, a modified seal member 61 is herein disclosed for attachment to the bottom peripheral windshield edge portion of the windshield assembly, and which is especially designed to compensate for any irregularities in the contour of the boat deck for example as may occur in curved deck portions having a centrally located crown.

Specifically, the seal member 61 in its instant modified form is seen to be substantially ovular in configuration, being formed of a suitable rubber-like material, wherein the upper portion thereof is integrally formed with a pair of spaced lips 62 extending upwardly from its central body portion to define an arcuate groove 63 of suitable dimension so as to accommodate the portion of the frame 15 mounted on the bottom peripheral edge of the windshield. The bottom portion of the seal member is seen to be bulbous or cellular in its configuration as shown at 64 to thereby define a cavity therein as is indicated at 65, and which is intended to be substantially filled with a soft pliable and/or spongy material such as polyurethane.

With the windshield assembly 10 mounted on the boat deck D in the manner previously described, the weight of said assembly is sufficient to press firmly against the seal member 61 whereby the aforementioned cellular portion 64 thereof closely conforms to the contour of the deck and/or any irregularities thereon to thereby provide a substantially liquid-proof seal therebetween.

In FIGS. 7 and 8, there is herein shown several additional modifications of seal member especially designed for attachment to the bottom peripheral edge of the windshield in the instant windshield assembly.

Specifically, as is seen in FIG. 7, one of said modified forms of seal member is provided with a groove 75 which is substantially clover leaf in its cross-sectional configuration, and which extends longitudinally along the front wall of said seal member. A wedge 76 of corresponding configuration and which may be formed of the same and/or a different material is intended to be disposed in the said groove 75. As will be realized, this combined construction of seal member is effective to provide its front wall portion adjacent the aforementioned wedge 76 with additional resilient characteristics whereby it is more firmly attached to the windshield frame.

In FIG. 8, the embodiment of seal member as is identified in its entirety by the reference numeral 81, is substantially ovular in overall configuration and integrally formed with a lower cellular portion having closed chambers for example as are defined at a, b and c, said cellular portion being thus adapted to act somewhat as an air cushion and functioning to closely correspond to the variations and/or the irregularities in the contour of the boat deck D to thereby provide an efficient fluid-leak proof seal between the latter and the windshield assembly mounted thereon. If desired, the chambers a, b and c may also be filled with a suitable pliable material as in the previous embodiment.

It may be desired to anchor the windshield frame 15 overlying the bottom peripheral windshield edge directly to the boat deck D, and for this purpose, I prefer to use one of the several embodiments of anchor means as is herein disclosed in FIGS. 9 and 10.

In the anchor means shown in FIG. 9, the windshield frame is pierced to provide an aperture 90 at predetermined spaced intervals along the bottom peripheral edge portion thereof each of said apertures 90 being adapted to accommodate an internally threaded shell member 91, each of which is provided with an enlarged conical-shaped head portion 91a and a sleeve part 91b. The shell member is disposed in the windshield frame so that the head portion 91a thereof lies against the inner surface of the windshield frame surrounding said aperture and the aforesaid sleeve part 91b extends downwardly therefrom and through a suitable aperture 93 provided in the underlying seal member. A suitable fastener as at 94 is intended to be threaded into the sleeve part 91b and a nut 96 threaded over the opposite end being thereby effective to anchor the windshield frame 15 and associated windshield assembly to the boat deck.

In FIG. 10, a T-head bolt 98 is used instead of the shell member 91, the head of said bolt being shaped to closely overlie the inner surface of the windshield frame adjoining the aforementioned aperture 80 formed in the latter. The shank 98a of said bolt projects through the aperture 93 provided in the seal member and is securely fastened by means of nut 98c to the underlying boat deck D to thereby firmly attach the windshield assembly to said deck.

In FIG. 11, I herein disclose a rear view mirror assembly 102 which may be bonded directly to either side section 13a of the windshield 12 in any one of the prior windshield assemblies, and which is operable to facilitate viewing the rear portions of the boat directly from the vehicle cockpit C.

In view of the aforementioned detailed description of several preferred embodiments of windshield assembly of the present invention, it will now be realized that the same provides a novel and improved unitary construction, and which is readily attachable to the deck of a boat or like watercraft.

It will likewise be apparent to those skilled in the art that the novel and improved windshield assembly and modifications of several components thereof as are hereinabove disclosed is susceptible to various combinations, modifications and arrangements of elements thereof without departing from its inventive concepts as are defined in the appended claim.

What is claimed is:

In combination, a marine vehicle having a deck, a windshield assembly for attachment in an upright windshielding position and extending laterally across said deck, comprising a transparent windshield having a non-linear peripheral edge and including a bottom longitudinal edge portion conforming to the lateral contour of said deck, a substantially C-shaped seal strip formed of a rubbery material placed over said peripheral edge of said windshield and extending over the opposite windshield edges closely adjacent thereto, said seal strip being bonded to said windshield, a narrow rigid frame mounted over said seal strip being similar in cross sectional configuration and having lip means on its opposed longitudinal edges thereof in engagement with said seal strip effective to anchor said frame to the latter, a second seal strip having a central portion of U-shaped cross sectional configuration being clamped over said frame along said bottom longitudinal edge of said windshield, said second seal strip having a surface in sealing relation with said deck, and wedge means insertable into said second seal strip adjacent its central portion effective to urge the latter into clamping engagement with said frame.

References Cited in the file of this patent

UNITED STATES PATENTS

| | | |
|---|---|---|
| 2,625,715 | Beck | Jan. 20, 1953 |
| 2,647,289 | Harbert | Aug. 4, 1953 |
| 2,671,541 | Kramer | Mar. 9, 1954 |
| 2,715,250 | Bedford | Aug. 16, 1955 |
| 2,937,652 | Zimmer et al. | May 24, 1960 |
| 2,968,845 | Dickinson | Jan. 24, 1961 |
| 3,001,212 | Towne | Sept. 26, 1961 |
| 3,021,535 | Dorst | Feb. 20, 1962 |

FOREIGN PATENTS

| | | |
|---|---|---|
| 830,321 | Great Britain | Mar. 16, 1960 |